C. ARNDT.
BEET HARVESTER.
APPLICATION FILED NOV. 12, 1915.
1,231,836.
Patented July 3, 1917.
3 SHEETS—SHEET 3.
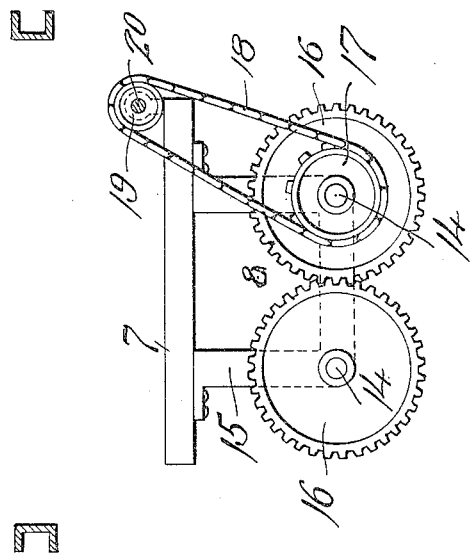
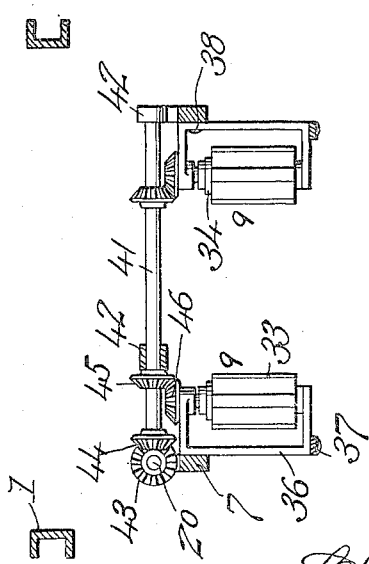
INVENTOR
Charles Arndt,
WITNESSES
BY Richard B. Owen,
ATTORNEY

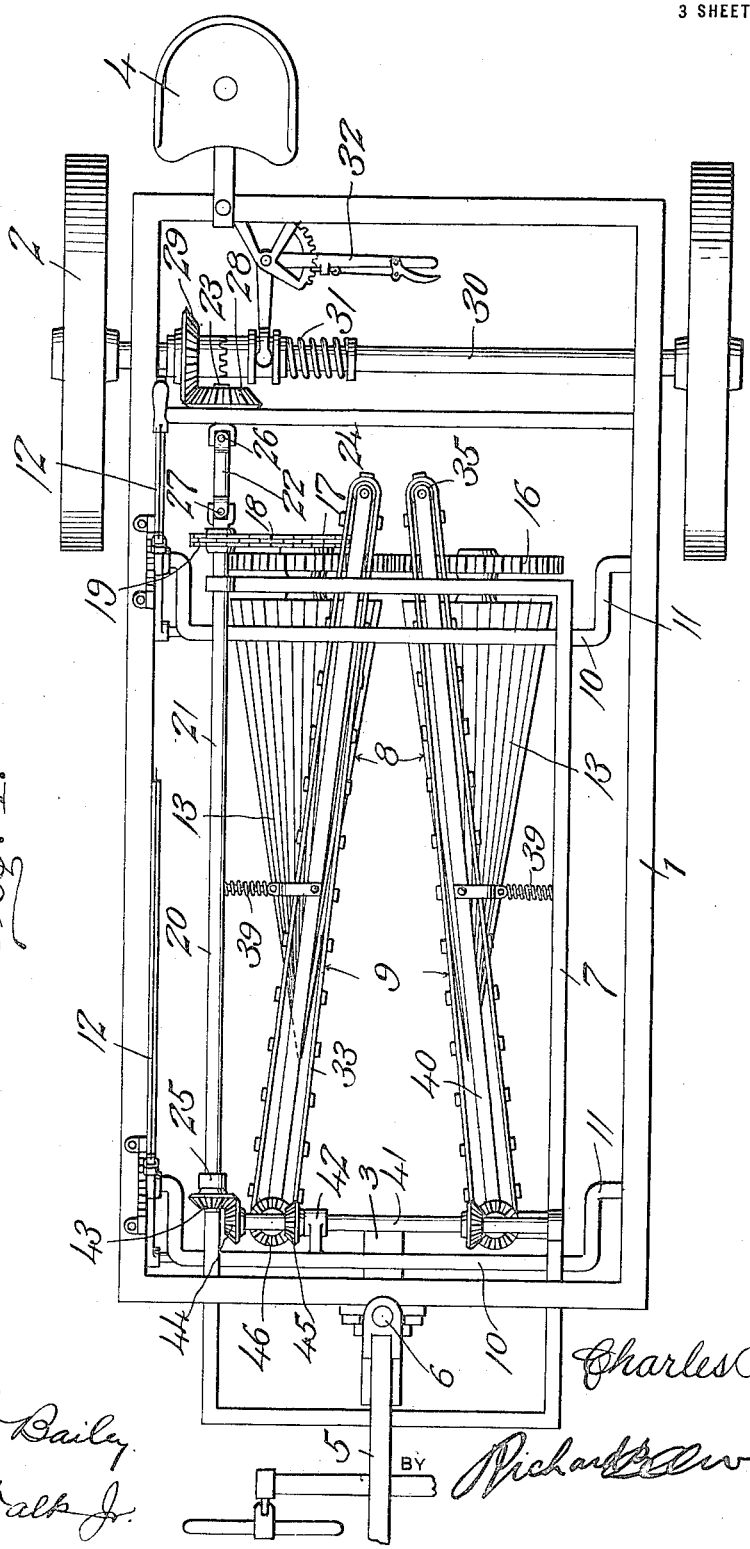

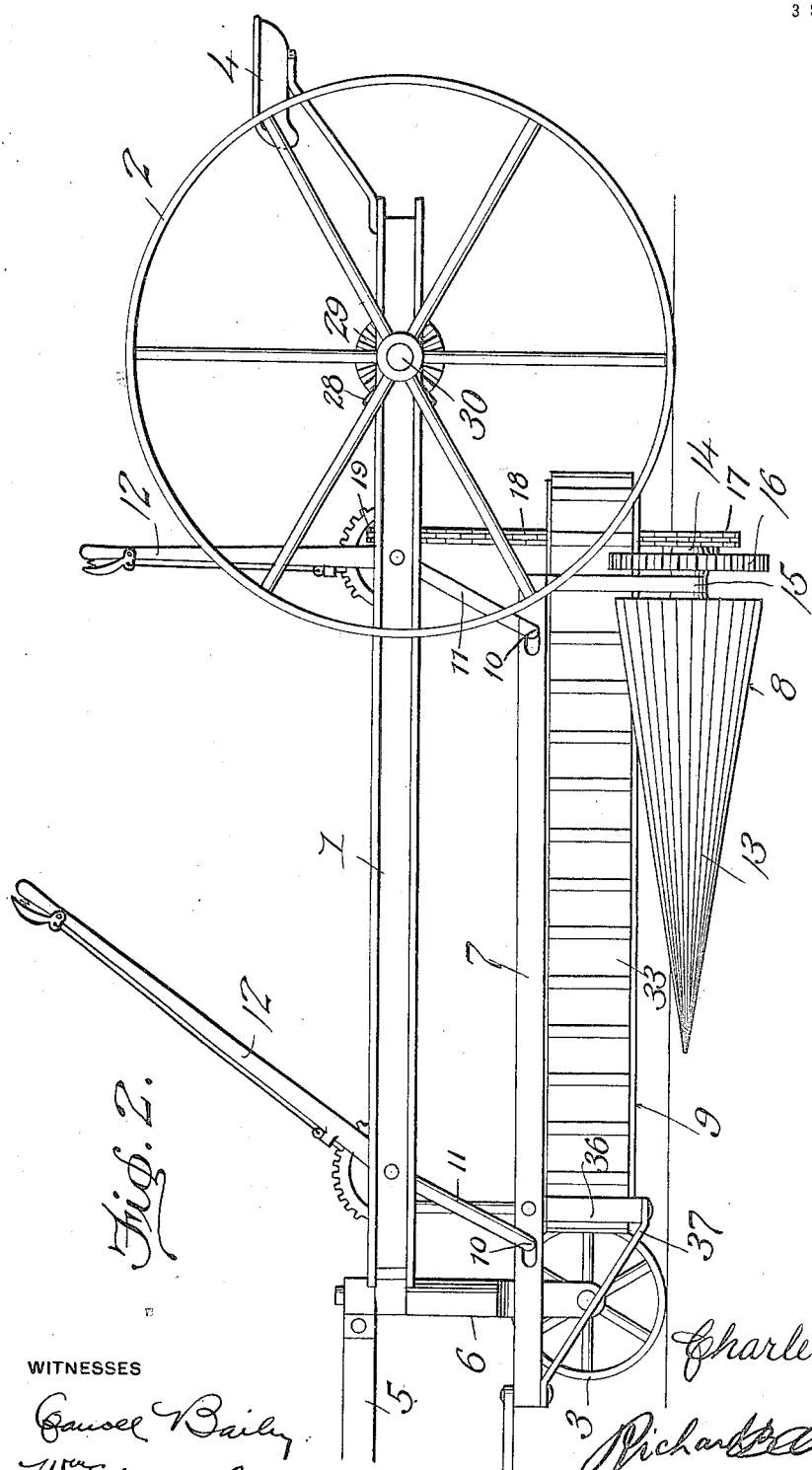

UNITED STATES PATENT OFFICE.

CHARLES ARNDT, OF TINA, MISSOURI.

BEET-HARVESTER.

1,231,836.     Specification of Letters Patent.     Patented July 3, 1917.

Application filed November 12, 1915. Serial No. 61,110.

*To all whom it may concern:*

Be it known that I, CHARLES ARNDT, citizen of the United States, residing at Tina, in the county of Carroll and State of Missouri, have invented certain new and useful Improvements in a Beet-Harvester, of which the following is a specification.

My invention relates to harvesters of a construction designed for extracting beets.

Essentially, the invention may be said to consist of an extracting mechanism; a conveyer mechanism mounted to coöperate with the extracting mechanism; a support for both the extracting mechanism and the conveyer mechanism; and a means for adjusting said support to move the extracting mechanism into and out of engagement with the ground.

In describing my invention in detail reference will be had to the accompanying drawings wherein like characters denote like or corresponding parts throughout the several views, and in which:

Figure 1 is a top plan view of the machine;

Fig. 2 is a side elevation;

Fig. 3 is an end view of the conveyer mechanism; and

Fig. 4 is a rear end view of the extracting mechanism.

Before proceeding with a description of the drawings I desire to call particular attention to the fact that while I have evolved my invention with reference to its use as a beet extractor or harvester, the same, if desired, and by slight modification, might be used for extracting or harvesting turnips, onions, carrots, and other biennial herbs.

Referring now to the drawings by numerals, 1 designates the machine frame, 2 the rear supporting wheels therefor, 3 a single front combined supporting and steering wheel, 4 a seat, and 5 the draft tongue, the latter, said tongue, having a direct connection as indicated at 6 with the front wheel 3.

An auxiliary frame 7, relatively small, is secured for vertical adjustment with respect to the main frame 1 that the extracting mechanism, designated as an entirety by the numeral 8 and the conveyer mechanism designated as an entirety by the numeral 9 may be raised and lowered out of and into operative relation with the beets or other herbs. Shafts 10 equipped with crank terminals 11, disposed one adjacent each end of the auxiliary frame 7, support said frame for movement in the manner stated. A lever 12 is operatively associated with each shaft 10 that the mentioned shafts may be independently adjusted with respect to the auxiliary frame 7 at an angle to the horizontal, if desired.

The extracting mechanism 8 in its preferred embodiment consists of oppositely rotating corrugated cones 13 disposed, apex foremost, in a substantially horizontal plane beneath the auxiliary frame 7, one at each side of the machine and in such relation as to engage and extract, during advancement of the machine, all beets or other herbs coming in contact with the oppositely moving corrugated surfaces of the respective cones. Each cone is mounted on a stub shaft 14 journaled in a suitable bearing 15 therefor hung from the rear end of the auxiliary frame. A gear 16 is mounted on each shaft 14, the two gears thus mounted, meshing, that the cones may be rotated oppositely for the purpose stated. One of said shafts 14 is equipped with a sprocket 17 over which is arranged a chain 18, the latter, chain 18 engaging with a sprocket 19 in turn mounted on a shaft 20 disposed at one side of the auxiliary frame. The shaft 20 (said shaft being designated as an entirety) is made up of connected shaft sections 21, 22 and 23, the latter, section 23 being journaled in a beam 24 mounted to extend transversely of the main frame 1, and the former, section 21, being journaled as before suggested in bearings 25 secured to the auxiliary frame 7. The remaining or intermediate shaft section 22 has a universal connection as indicated at 26 with the shaft section 23 and a universal connection as indicated at 27 with the shaft section 21 that that portion of the shaft 20 carried by the auxiliary frame may move relatively to that portion of the shaft carried by the main frame through adjustment of the auxiliary frame as hereinbefore stated.

Shaft section 23 carries a bevel gear 28 for mesh with a like gear 29 mounted on the rear wheel axle designated 30. The power necessary to proper operation of the extracting mechanism 8 and the conveying mechanism 9 is derived through rotation of the mentioned axle.

As a means whereby the mechanisms 8 and 9 may be rendered operative or inoperative, as desired, I have provided a clutch mechanism designated 31, associating the said mechanism with the gear 29 and disposing the control lever therefor, 32, in proximity to the seat 4 for the operator.

Coming now to a description of the conveyer mechanism 9, each conveyer (there being two) is designated 33. The mentioned conveyers extend in divergent relation, the diverging end foremost, that the beets extracted by the cones 13 may be grasped and conveyed thereby to a point of deposit at the rear of the extracting cones. Each conveyer is mounted to engage with rollers 34 and 35 mounted for movement on vertical axes. Brackets 36, braced as indicated at 37, support the conveyer in the manner desired, each bracket being secured as indicated at 38 to the auxiliary frame. That beets varying in size may be grasped and conveyed by the opposed conveyers, each conveyer is mounted in a manner permitting of yielding movement. The conveyers when thus moved or separated swing on the axes of the rollers 34 and against tension of springs 39 interposed between the auxiliary frame 7 and the conveyer frames, designated 40. The springs 39 act to maintain the conveyers 33 in the position desired or in such relation to the cones 13 as to grasp and convey the extracted beets in the manner stated.

A shaft 41, journaled in bearings 42 is mounted for movement with the auxiliary frame and at the forward end thereof. Movement is imparted to said shaft 41 through the medium of a gear 43 mounted on the shaft 20 and a gear 44 mounted on the shaft 41, the mentioned gears meshing. Shaft 41 is further provided with gears 45, opposed, these latter gears being in mesh with gears 46 which serve to drive or move the conveyers 33.

From the foregoing, taken in connection with the accompanying drawings it will be noted that the conveyers 33 coöperate with the cones 13 in extracting the beets, in that said beets, when loosened, are grasped by the conveyers and carried to a point of deposit at the rear of the cones; that the extracting mechanism 8 and the conveyer mechanism 9 operate in unison, both mechanisms being supported by the auxiliary frame; and that in actual practice, beets varying in size may be grasped and conveyed, the conveyers yielding, to meet conditions.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a beet harvester, extracting and conveying mechanisms comprising opposed corrugated cones adapted for penetrating engagement with the soil to engage with and extract the beets therefrom, the axes of the cones being parallel so as to dispose the sides of the cones in forwardly diverging relation, said axes being also normally horizontal and parallel to the level of the ground, rearwardly converging endless conveyers disposed in parallel vertical alinement with the adjacent surfaces of the cones, said conveyers being adapted for horizontal rearward movement, means for rotating the cones oppositely, means for actuating the conveyers, and means for moving the cones and conveyers toward and away from the ground.

2. In a beet harvester, a wheel supported main frame, an auxiliary frame, means for raising and lowering said auxiliary frame, a pair of horizontally spaced cones mounted on the auxiliary frame with their apices directed forwardly and their axes disposed parallel to each other and to the level of the ground, a gear rotatable with each cone, and in meshing engagement, a sprocket wheel rotatable with one gear, a pair of horizontal, rearwardly converging endless conveyers disposed in parallel vertical alinement with the adjacent surfaces of the cones, and adapted for rearward movement, rollers for supporting the conveyers, a bevel gear on one roller of each conveyer, a transverse shaft mounted on the auxiliary frame having bevel gears for engagement with the conveyer gears, a main drive shaft mounted on the auxiliary frame for driving said transverse shaft, a sprocket wheel on said main shaft, a chain connecting said sprocket wheel and the first mentioned sprocket wheel, a gear mounted on the main frame driven by the supporting wheels, and a flexible connection between said last mentioned gear and the main shaft.

In testimony whereof I affix my signature in presence of two witnesses.

CHARLES ARNDT.

Witnesses:
A. Y. HOUSTON,
J. F. MCCALL.

Copies of this patent may be obtained for five cents each, by addressing the "Commissioner of Patents, Washington, D. C."